(No Model.)

W. A. HULL.
LAMP FIXTURE.

No. 307,652. Patented Nov. 4, 1884.

Witnesses
James R. Bowen.
T. J. Keane

Inventor
W. A. Hull,
by his attorney,
Edwin H. Brown.

N. PETERS, Photo-Lithographer, Washington, D. C.

United States Patent Office.

WOLCOTT A. HULL, OF NEW YORK, N. Y.

LAMP-FIXTURE.

SPECIFICATION forming part of Letters Patent No. 307,652, dated November 4, 1884.

Application filed March 3, 1884. (No model.)

*To all whom it may concern:*

Be it known that I, WOLCOTT A. HULL, of New York, in the county and State of New York, have invented a certain new and useful Improvement in Lamp-Fixtures, of which the following is a specification.

My improvement relates to lamp-fixtures such as have an extensible part suspended by chains which are attached at one end to it, run thence over pulleys in a hanger, and at the other end are attached to a counterbalancing-weight. In such a lamp-fixture it has been difficult to maintain an exact balance between the extensible part and the weight, owing in part to the varying quantity of oil in the oil-reservoir of the lamp carried by the extensible part, and sometimes to the use of shades of different weights. To obviate this difficulty devices have been used for exerting a friction upon the pulleys over which the chains passed.

My improvement involves the use of springs for this purpose. I use the springs, however, so that they press upon the chains above the pulleys, holding them in place upon the pulleys and exerting the necessary friction upon them.

Figure 1:
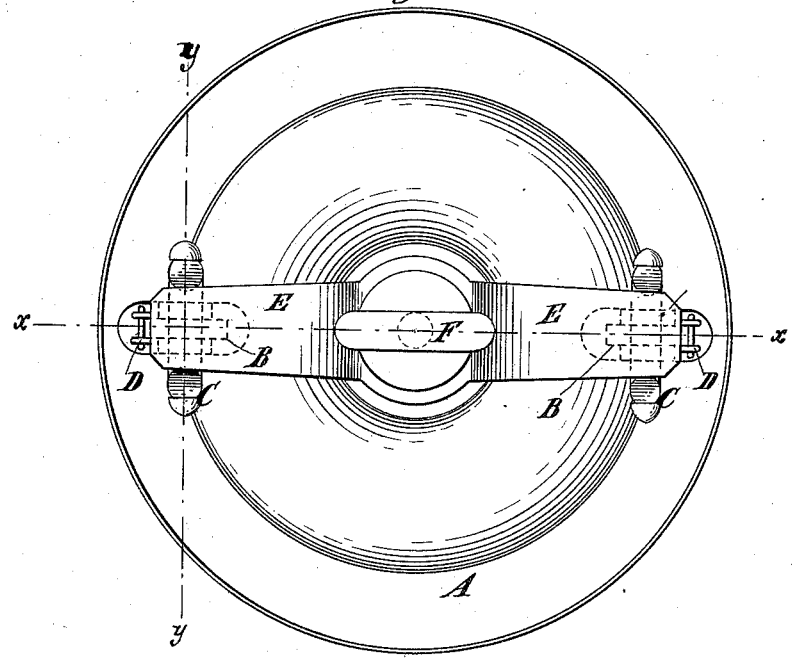
Figure 2:
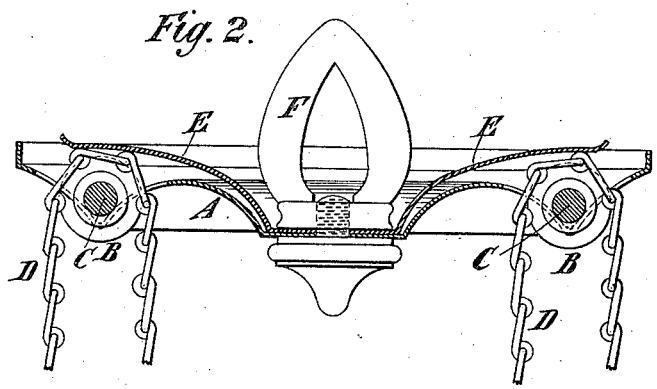
Figure 3:
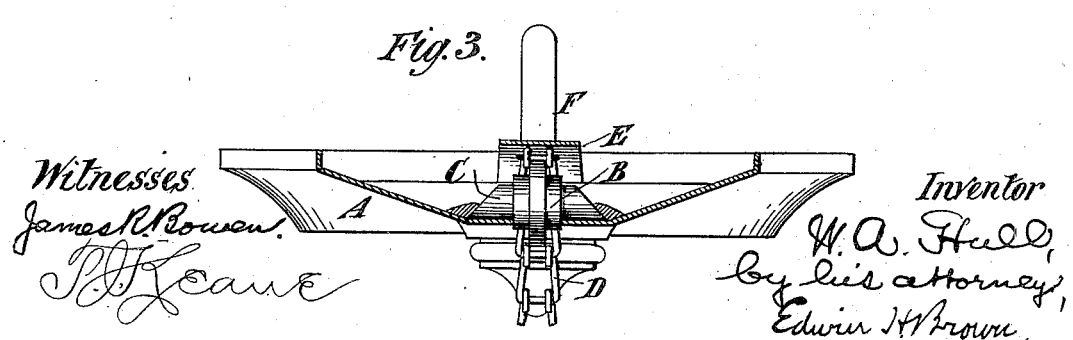

In the accompanying drawings, Figure 1 is a top view of a lamp-hanger embodying my improvement and chains depending from the same. Fig. 2 is a vertical section of the same, taken at the plane of the line $x\ x$, Fig. 1; and Fig. 3 is a vertical section taken at the plane of the line $y\ y$, Fig. 1.

Similar letters of reference designate corresponding parts in all the figures.

A designates a shell or plate of sheet metal, bent up into a shape which will both strengthen it and improve its appearance.

B designates pulleys or wheels, here shown as mounted loosely upon axles C, secured to the shell A.

D designates chains passing around the pulleys B and through openings in the shell or plate A. The pulleys B have their circumferences provided with seats to accommodate the chains D. As here shown, said seats consist of peripherical grooves in the pulleys.

E designates springs fastened to the shell or plate A and extending into contact with the chains D above the pulleys B. As here shown, the two springs E are formed together in one piece, which is secured to the shell or plate A by means of the screw or bolt that fastens a suspending loop or eye, F, thereto. The piece is suitably bent at the sides of the screw or bolt to form the springs.

The springs E serve to hold the chains in place on the pulleys B, and also exert a friction thereon.

What I claim as my invention, and desire to secure by Letters Patent, is—

1. In a lamp-hanger, the combination of pulleys having their circumferences provided with seats to accommodate chains passing over the same and to prevent said chains from being deflected laterally in their passage over the pulleys, and springs extending over the seats in the pulleys and impinging directly on the chains, substantially as specified.

2. The combination, in a lamp-hanger, of chains D, pulleys B, having seats to accommodate said chains, and springs E, arranged above said seats and impinging on said chains, substantially as specified.

3. In a lamp-hanger, the combination of the springs E, made in one piece, the shell A, the loop F, and a screw for securing said springs, shell, and loop together, substantially as specified.

WOLCOTT A. HULL.

Witnesses:
CHAUNCEY G. STEVENS,
T. J. KEANE.